US010679243B2

(12) United States Patent
Dunn (10) Patent No.: US 10,679,243 B2
(45) Date of Patent: Jun. 9, 2020

(54) SYSTEM AND METHOD FOR TRACKING AND ANALYZING CONSUMPTION (71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

(21) Appl. No.: 16/295,591

(22) Filed: Mar. 7, 2019

(65) Prior Publication Data

US 2019/0205922 A1 Jul. 4, 2019

Related U.S. Application Data (60) Division of application No. 15/495,086, filed on Apr. 24, 2017, now Pat. No. 10,269,038, which is a
(Continued)

(51) Int. Cl.
*G06Q 30/06* (2012.01)
*G06Q 30/02* (2012.01)
(Continued)

(52) U.S. Cl.
CPC ......... *G06Q 30/0246* (2013.01); *G06F 3/147* (2013.01); *G06Q 10/087* (2013.01);
(Continued)

(58) Field of Classification Search
CPC ......... G09F 2023/0033; G09F 23/0058; G09F 23/06; G09F 23/065; G09F 9/35;
(Continued)

(56) References Cited

U.S. PATENT DOCUMENTS 3,629,972 A 12/1971 Rehberg et al.
4,040,726 A 8/1977 Paca
(Continued)

FOREIGN PATENT DOCUMENTS

AU 2015277337 B2 9/2018
CA 2815355 A1 5/2012
(Continued)

OTHER PUBLICATIONS

A. Vogler & H. Kunkley, Photochemistry and Beer, Jan. 1982, 3 Pages, vol. 59, No. 1.
(Continued)

*Primary Examiner* — Hongmin Fan
(74) *Attorney, Agent, or Firm* — Standley Law Group LLP; Jeffrey S. Standley; Adam J. Smith (57) ABSTRACT A system and method for tracking and analyzing consumption of consumer goods is provided. A transparent electronic display displays advertising content related to nearby consumer goods. A sensor detects whether any of the consumer goods have been selected by a customer. A CPU in electrical communication with the sensor and the transparent electronic display monitors the sensor and stores consumption data regarding the content displayed on the transparent electronic display when the sensor detects that any of the consumer goods have been selected.

20 Claims, 9 Drawing Sheets

Related U.S. Application Data continuation of application No. 14/740,997, filed on Jun. 16, 2015, now Pat. No. 9,633,366.

(60) Provisional application No. 62/013,917, filed on Jun. 18, 2014, provisional application No. 62/013,225, filed on Jun. 17, 2014, provisional application No. 62/012,559, filed on Jun. 16, 2014.

(51) Int. Cl.
    *G09G 3/00*         (2006.01)
    *G06F 3/147*       (2006.01)
    *G06Q 10/08*      (2012.01)

(52) U.S. Cl.
    CPC ......... *G06Q 30/0242* (2013.01); *G09G 3/006* (2013.01); *G09G 2300/04* (2013.01); *G09G 2354/00* (2013.01); *G09G 2370/02* (2013.01); *G09G 2370/022* (2013.01); *G09G 2370/16* (2013.01)

(58) Field of Classification Search
    CPC .. A47F 3/0434; G09G 3/006; G09G 2300/04; G09G 2300/02; G09G 2300/022; G09G 2300/16; G06Q 30/0242
    See application file for complete search history.

(56) References Cited

U.S. PATENT DOCUMENTS

| | | | |
|---|---|---|---|
| 4,299,092 | A | 11/1981 | Ibrahim |
| 4,371,870 | A | 2/1983 | Biferno |
| 4,738,042 | A * | 4/1988 | Corden ............... G09F 23/06 40/472 |
| 4,853,678 | A | 8/1989 | Bishop, Jr. et al. |
| 4,950,344 | A | 8/1990 | Glover et al. |
| 7,413,233 | B1 | 8/2008 | Jung |
| 7,455,412 | B2 | 11/2008 | Rottcher |
| 7,513,637 | B2 | 4/2009 | Kelly et al. |
| 7,922,381 | B2 | 4/2011 | Han et al. |
| 8,254,121 | B2 | 8/2012 | Lee et al. |
| 8,417,376 | B1 | 4/2013 | Smolen |
| 8,578,081 | B1 | 11/2013 | Fils |
| 8,683,745 | B2 | 4/2014 | Artwohl et al. |
| 8,982,013 | B2 | 3/2015 | Sako et al. |
| 8,988,635 | B2 | 3/2015 | Dunn et al. |
| 9,052,536 | B2 | 6/2015 | Artwohl et al. |
| 9,155,405 | B2 | 10/2015 | Artwohl et al. |
| 9,173,509 | B2 | 11/2015 | Mischel, Jr. et al. |
| 9,500,801 | B2 | 11/2016 | Dunn |
| 9,500,896 | B2 | 11/2016 | Dunn et al. |
| 9,514,661 | B2 | 12/2016 | Riegel |
| 9,519,185 | B2 | 12/2016 | Dunn et al. |
| 9,526,352 | B2 | 12/2016 | Dunn et al. |
| 9,535,293 | B2 | 1/2017 | Dunn |
| 9,633,366 | B2 | 4/2017 | Dunn |
| 9,661,939 | B2 | 5/2017 | Dunn et al. |
| 9,684,124 | B2 | 6/2017 | Dunn |
| 9,733,420 | B2 | 8/2017 | Dunn et al. |
| 9,832,847 | B2 | 11/2017 | Dunn et al. |
| 9,881,528 | B2 | 1/2018 | Dunn |
| 9,983,427 | B2 | 5/2018 | Dunn |
| 10,052,026 | B1 | 8/2018 | Tran |
| 10,182,665 | B2 | 1/2019 | Dunn et al. |
| 2002/0064037 | A1 | 5/2002 | Lee |
| 2002/0075552 | A1 | 6/2002 | Poll et al. |
| 2002/0187575 | A1 | 12/2002 | Maruyama et al. |
| 2003/0062813 | A1 | 4/2003 | Cording |
| 2003/0117790 | A1 | 6/2003 | Lee et al. |
| 2003/0139169 | A1 | 7/2003 | Arreasola, Jr. |
| 2004/0148055 | A1 | 7/2004 | Shoenfeld |
| 2004/0160388 | A1 | 8/2004 | O'Keeffe |
| 2005/0195972 | A1 | 9/2005 | Barr |
| 2005/0265019 | A1 | 12/2005 | Sommers et al. |
| 2006/0012985 | A1 | 1/2006 | Archie, Jr. et al. |
| 2006/0215958 | A1 | 9/2006 | Yeo et al. |
| 2006/0284788 | A1 | 12/2006 | Robinson et al. |
| 2007/0151274 | A1 | 7/2007 | Roche et al. |
| 2007/0171647 | A1 | 7/2007 | Artwohl et al. |
| 2007/0195535 | A1 | 8/2007 | Artwohl et al. |
| 2007/0214812 | A1 | 9/2007 | Wagner et al. |
| 2007/0288332 | A1 * | 12/2007 | Naito ................... G06Q 30/06 705/27.2 |
| 2008/0024047 | A1 | 1/2008 | Juo et al. |
| 2008/0042554 | A1 | 2/2008 | Komoto et al. |
| 2008/0055534 | A1 | 3/2008 | Kawano |
| 2008/0094854 | A1 | 4/2008 | Coleman et al. |
| 2008/0284942 | A1 | 11/2008 | Mahama et al. |
| 2008/0295033 | A1 | 11/2008 | Lee et al. |
| 2009/0002990 | A1 | 1/2009 | Becker et al. |
| 2009/0015400 | A1 | 1/2009 | Breed |
| 2009/0097227 | A1 | 4/2009 | Kim et al. |
| 2009/0121970 | A1 | 5/2009 | Ozbek |
| 2009/0178427 | A1 | 7/2009 | Eichman |
| 2009/0225519 | A1 | 9/2009 | Mischel, Jr. et al. |
| 2009/0244884 | A1 | 10/2009 | Trulaske, Sr. |
| 2009/0278766 | A1 | 11/2009 | Sako et al. |
| 2009/0298547 | A1 | 12/2009 | Kim et al. |
| 2009/0300953 | A1 | 12/2009 | Frisch et al. |
| 2010/0026912 | A1 | 2/2010 | Ho |
| 2010/0058628 | A1 | 3/2010 | Reid et al. |
| 2010/0118200 | A1 | 5/2010 | Gelman et al. |
| 2010/0162747 | A1 | 7/2010 | Hamel et al. |
| 2010/0189571 | A1 | 7/2010 | Coonrod |
| 2010/0238394 | A1 | 9/2010 | Dunn |
| 2010/0275477 | A1 | 11/2010 | Kim |
| 2010/0293827 | A1 | 11/2010 | Suss et al. |
| 2010/0309687 | A1 | 12/2010 | Sampsell et al. |
| 2011/0056102 | A1 | 3/2011 | Reid et al. |
| 2011/0083460 | A1 | 4/2011 | Thomas et al. |
| 2011/0116000 | A1 | 5/2011 | Dunn et al. |
| 2011/0116231 | A1 | 5/2011 | Dunn et al. |
| 2011/0261282 | A1 | 10/2011 | Jean et al. |
| 2011/0302944 | A1 * | 12/2011 | Howington ........... A47F 3/0434 62/246 |
| 2012/0020560 | A1 | 1/2012 | Zarubinsky |
| 2012/0062080 | A1 * | 3/2012 | Maslen ................ A47F 3/0434 312/116 |
| 2012/0105424 | A1 | 5/2012 | Lee et al. |
| 2012/0105428 | A1 | 5/2012 | Fleck et al. |
| 2012/0206500 | A1 | 8/2012 | Koprowski et al. |
| 2012/0206941 | A1 | 8/2012 | He |
| 2012/0285089 | A1 | 11/2012 | Artwohl et al. |
| 2012/0287368 | A1 | 11/2012 | Que et al. |
| 2012/0287379 | A1 | 11/2012 | Koike |
| 2013/0016296 | A1 | 1/2013 | Fujita et al. |
| 2013/0063326 | A1 | 3/2013 | Riegel |
| 2013/0063676 | A1 | 3/2013 | Tsuchihashi et al. |
| 2013/0120815 | A1 | 5/2013 | Aspnes et al. |
| 2013/0151006 | A1 | 6/2013 | Garson et al. |
| 2013/0158703 | A1 | 6/2013 | Lin et al. |
| 2013/0208447 | A1 | 8/2013 | Maslen |
| 2013/0211583 | A1 | 8/2013 | Borra |
| 2013/0265525 | A1 | 10/2013 | Dunn et al. |
| 2013/0271674 | A1 | 10/2013 | Liu et al. |
| 2013/0271696 | A1 | 10/2013 | Dunn |
| 2014/0062316 | A1 | 3/2014 | Tischler et al. |
| 2014/0078407 | A1 | 3/2014 | Green et al. |
| 2014/0085564 | A1 | 3/2014 | Hendren et al. |
| 2014/0104538 | A1 | 4/2014 | Park et al. |
| 2014/0137065 | A1 | 5/2014 | Feng et al. |
| 2014/0144083 | A1 | 5/2014 | Artwohl et al. |
| 2014/0204452 | A1 | 7/2014 | Branson |
| 2014/0285732 | A1 | 9/2014 | Tanabe et al. |
| 2014/0300979 | A1 | 10/2014 | Tomida et al. |
| 2014/0320950 | A1 | 10/2014 | Saxe et al. |
| 2014/0333541 | A1 | 11/2014 | Lee et al. |
| 2015/0035432 | A1 | 2/2015 | Kendall et al. |
| 2015/0172385 | A1 | 6/2015 | Kuroyama et al. |
| 2015/0177480 | A1 | 6/2015 | Bullock et al. |
| 2015/0250021 | A1 | 9/2015 | Stice et al. |
| 2015/0253612 | A1 | 9/2015 | Hasegawa et al. |
| 2015/0300628 | A1 | 10/2015 | Dunn et al. |

(56) References Cited

U.S. PATENT DOCUMENTS

| | | |
|---|---|---|
| 2015/0309263 A2 | 10/2015 | Abovitz et al. |
| 2015/0338715 A1 | 11/2015 | Schaefer et al. |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2017/0010771 A1 | 1/2017 | Bernstein et al. |
| 2017/0046991 A1 | 2/2017 | Riegel |
| 2017/0053456 A1 | 2/2017 | Cho et al. |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0256115 A1 | 9/2017 | Diaz |
| 2017/0329078 A1 | 11/2017 | Dunn et al. |
| 2018/0012526 A1 | 1/2018 | Dunn et al. |
| 2018/0020847 A1 | 1/2018 | Dunn et al. |
| 2018/0035521 A1 | 2/2018 | Dunn et al. |
| 2018/0151097 A1 | 5/2018 | Dunn |
| 2018/0368240 A1 | 12/2018 | Dunn et al. |

FOREIGN PATENT DOCUMENTS

| | | |
|---|---|---|
| CN | 101949526 A | 1/2011 |
| CN | 202815379 U | 3/2013 |
| EP | 3155607 A1 | 4/2017 |
| EP | 3422907 | 1/2019 |
| JP | 2008180502 A | 8/2008 |
| JP | 2008299660 A | 12/2008 |
| JP | 2010171010 A | 8/2010 |
| JP | 5173088 B1 | 1/2013 |
| JP | 2017531198 A | 10/2017 |
| KR | 1020040045939 A | 6/2004 |
| KR | 1020110119360 A | 11/2011 |
| KR | 1020120044874 A | 5/2012 |
| WO | WO2006055873 A2 | 5/2006 |
| WO | WO2010116202 A1 | 10/2010 |
| WO | WO2013056109 A1 | 4/2013 |
| WO | WO2014006490 A1 | 1/2014 |
| WO | WO2015195681 A1 | 12/2015 |
| WO | WO2016021751 A1 | 2/2016 |
| WO | WO2017151934 A1 | 9/2017 |
| WO | WO2018009399 A1 | 1/2018 |

OTHER PUBLICATIONS

Dave Roos, How Transmissive Film Works, 2008, 9 Pages.
Pilkington TEC Glass, For the Refrigeration Market, 2002, 2 Pages.

* cited by examiner

SYSTEM AND METHOD FOR TRACKING AND ANALYZING CONSUMPTION

CROSS-REFERENCE TO RELATED APPLICATIONS

This application is a divisional of U.S. Non-Provisional application Ser. No. 15/495,086 filed on Apr. 24, 2017, which is a continuation of U.S. Non-Provisional application Ser. No. 14/740,997 filed on Jun. 16, 2015 now U.S. Pat. No. 9,633,366, which claims the benefit of U.S. Provisional Application No. 62/013,917 filed on Jun. 18, 2014, U.S. Provisional Application No. 62/013,225 filed on Jun. 17, 2014, and U.S. Provisional Application No. 62/012,559 filed on Jun. 16, 2014, the disclosures of all of which are hereby incorporated by reference in their entireties.

TECHNICAL FIELD

Embodiments generally relate to systems and methods for tracking and analyzing the use of transparent liquid crystal displays (LCD) within display cases.

BACKGROUND OF THE ART

Display cases are used in a number of different retail establishments for illustrating the products that are available for sale. In some instances, these display cases may be coolers or freezers which are placed in grocery stores, convenience stores, gas stations, restaurants, or other retail establishments. In other instances, these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a system for tracking and analyzing display case usage. An exemplary display case contains a CPU and door sensor, as well as a connection to the internet or cellular network. Some display cases may also contain a temperature sensor. When the door is opened, an identifier for the image/video being currently shown is preferably stored at the CPU along with the date and time the door was opened. This data can be collected and transmitted via an internet/cellular network to an operations center having a CPU. In this way, the data can be analyzed to determine the traffic through the display case as well as the effectiveness of the images/videos being shown. By using the system and method described herein, the energy efficiency can be increased as well as the effectiveness of the advertisements.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figures 1, 2:
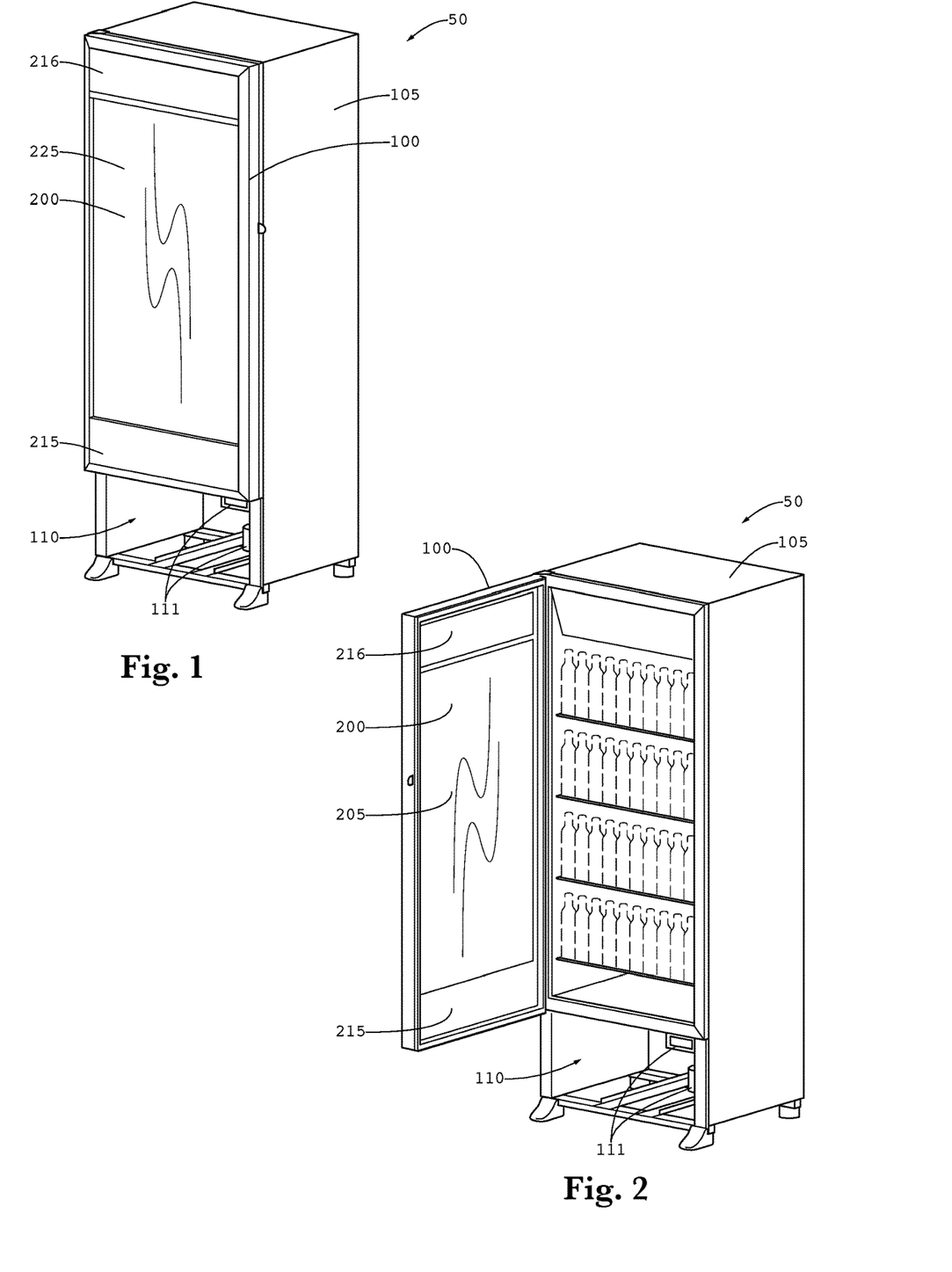
FIG. 1 is a perspective view of a refrigerated display case having a transparent LCD assembly.
FIG. 2 is a perspective view of the refrigerated display case of FIG. 1 where the door has been opened.

FIG. 1 is a perspective view of a refrigerated display case 50 having a transparent LCD 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: power modules, timing and control board (TCON), video player, CPU, wireless transmitter/receiver, cellular data transmitter/receiver, and internet connectivity. At least some of the electrical devices 111 are in electrical communication with the transparent LCD 200.

FIG. 2 is a perspective view of the refrigerated display case of FIG. 1 where the door has been opened. The transparent LCD 200 is preferably sandwiched between a front glass 225 and rear glass 205. Also preferably sandwiched between the front and rear glass 225/205 is an upper plate 216 and a lower plate 215, each of which are preferably attached to the rear glass 205 such that heat from the plates can be conductively transferred to the rear glass 205 and removed by natural or forced convection.

In an exemplary embodiment, the upper and lower plates 216/215 are preferably bonded to the rear glass 205 through adhesive transfer tape. An exemplary adhesive transfer tape for this purpose would be 468 MP, available commercially from 3M™ of St. Paul, Minn. www.3M.com/converter. In order to illuminate the transparent LCD 200, one or more printed circuit boards (PCBs) each containing a plurality of LEDs is preferably in conductive thermal communication with either the upper, lower, or both plates. In this way, heat that is generated by the LEDs can be transmitted to the PCB and eventually transferring to the rear glass 205 where the heat can dissipate through natural or forced convection.

Figure 3:
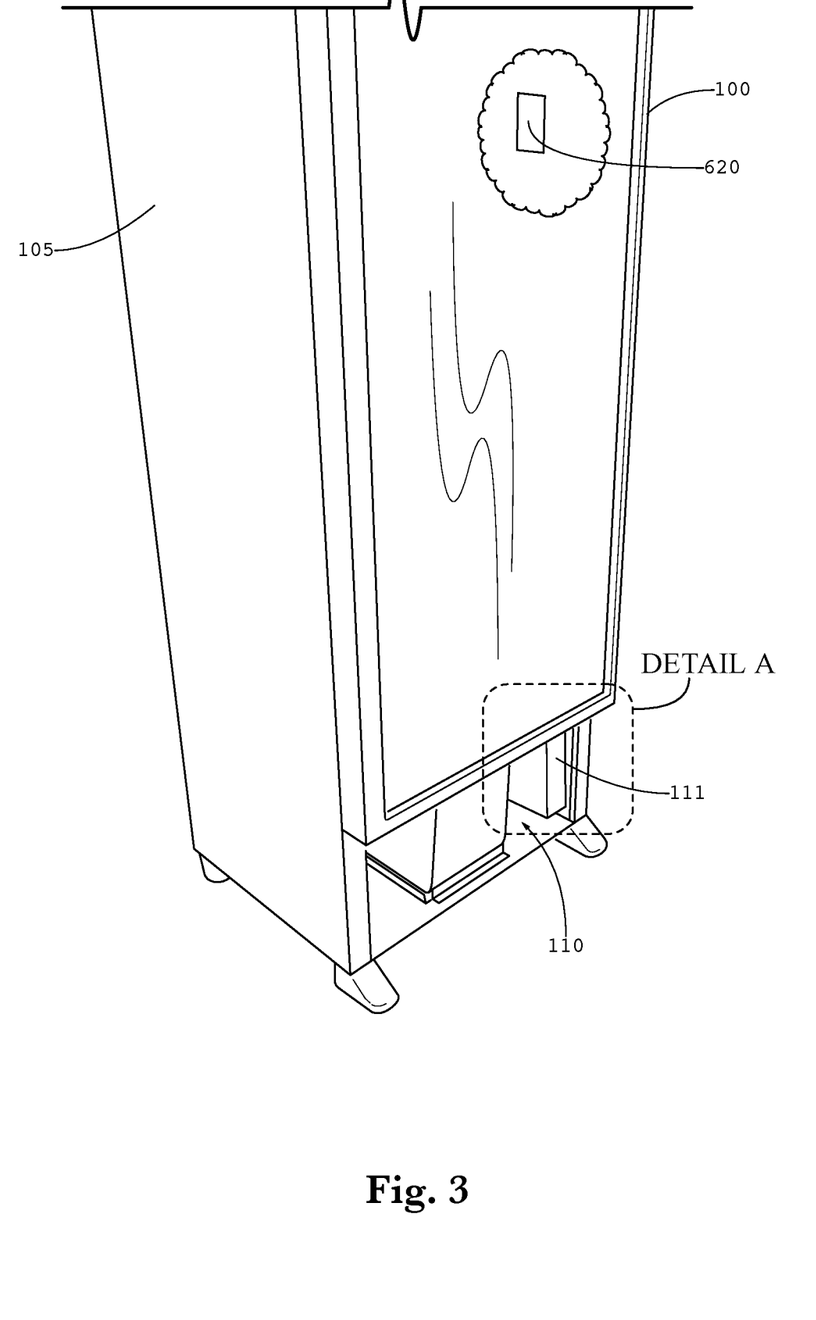
FIG. 3 is a perspective view of the refrigerated display case of FIG. 1 showing the cavity for electronic devices as well as the location of Detail A.
Figure 4:
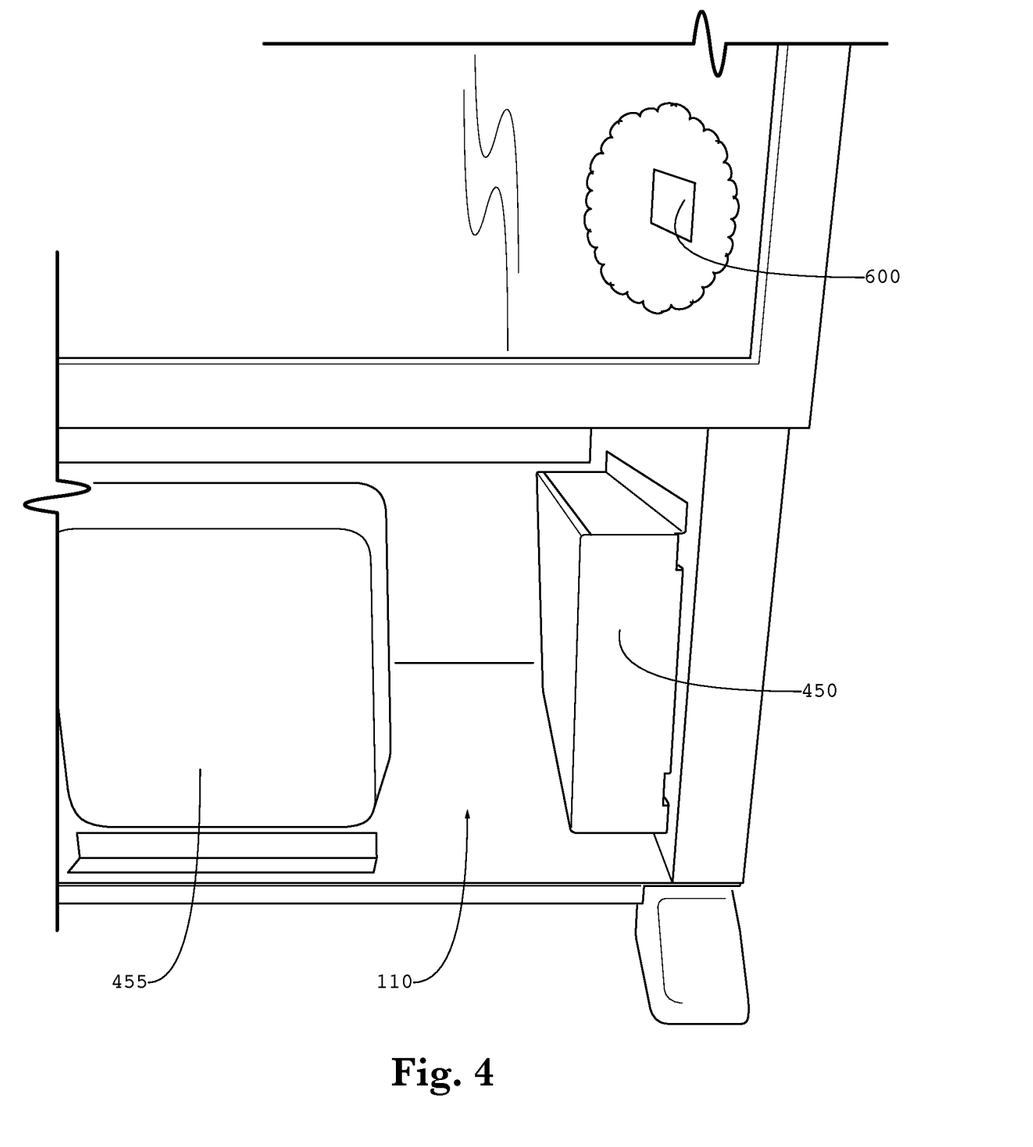
FIG. 4 is a front view of Detail A shown in FIG. 3.

FIG. 3 is a perspective view of the refrigerated display case of FIG. 1 showing the cavity for electronic devices as well as the location of Detail A. Also shown in this figure is the temperature sensor 620 which is in electrical communication with the CPU 455. The term CPU as used herein would preferably contain a microprocessor capable of executing software logic along with RAM storage as well as hard drive electronic storage. FIG. 4 is a front view of Detail A shown in FIG. 3. Here, a wireless transmitter/receiver 450 is shown within the cavity 110 as well as a CPU 455. Also shown here is a door sensor 600 which is positioned to determine whether the door is currently open or not. The door sensor 600 is preferably in electrical communication with the CPU 455, which contains an electrical connection to either an internet or satellite network.

Figure 5:
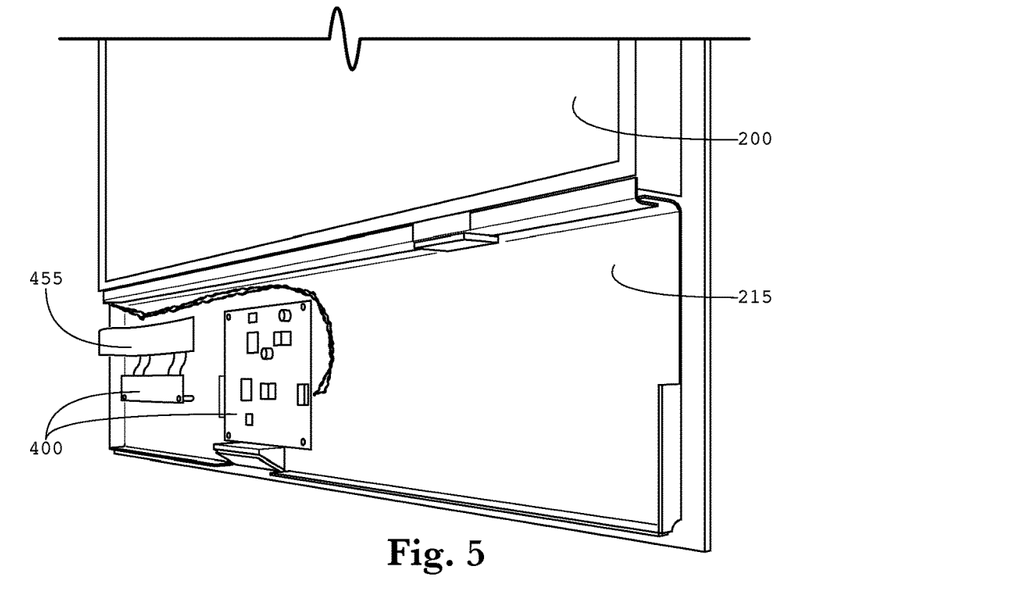
FIG. 5 is a perspective view showing a lower mounting plate and various electronic devices.

FIG. 5 is a perspective view showing a lower mounting plate 215 and various electronic devices 400 in electrical communication with the LCD 200. A second wireless transmitter/receiver 455 is positioned on the lower mounting plate 215 and communicates electronically with the wireless transmitter/receiver 450 shown within the cavity 110. A plurality of different signals can be transmitted between the two wireless devices 450/455 including but not limited to: image/video data, visual alerts, image inspection/test patterns, temperature of the display case, and feedback data from the LCD 200 such as brightness, color saturation, color temperature, gamma, and contrast ratio.

Figure 6:
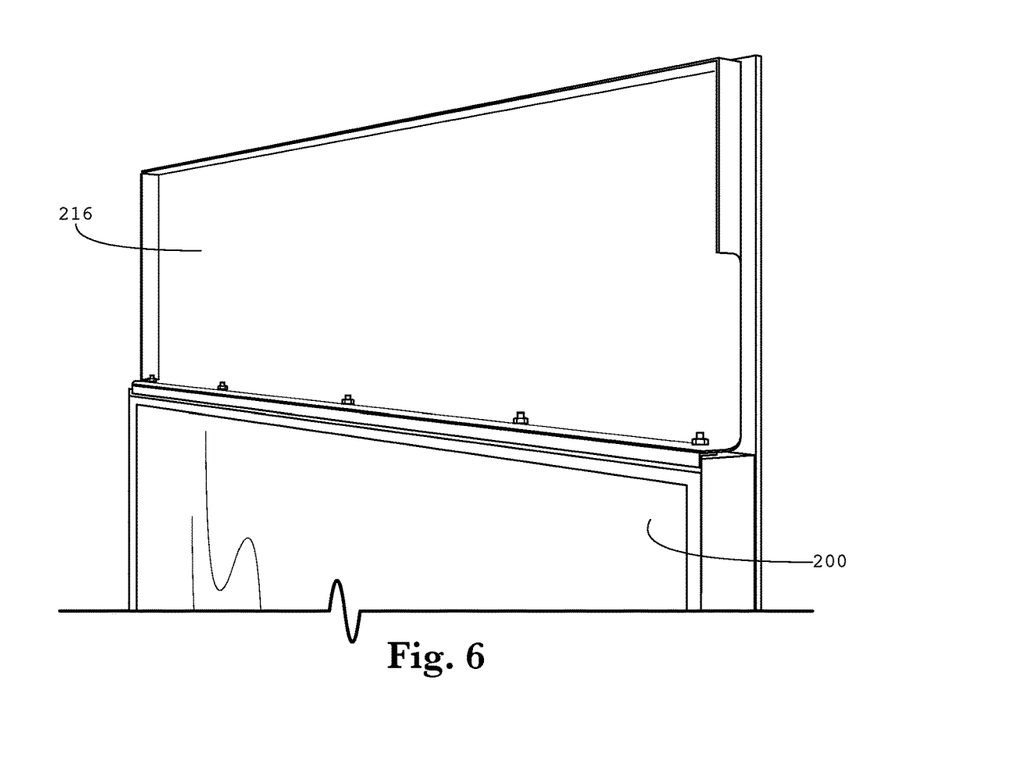
FIG. 6 is a perspective view showing an upper mounting plate.

As noted above, preferably the electronic devices 400 are in conductive thermal communication with the plate 215 which is preferably bonded to and in conductive thermal communication with the rear glass 205 so that heat generated by the electronic devices 400 can be removed. Similarly, FIG. 6 is a perspective view showing the upper mounting plate 216, which can also be used to mount various electronic devices and is also preferably bonded to and in conductive thermal communication with the rear glass 205.

Figure 7:
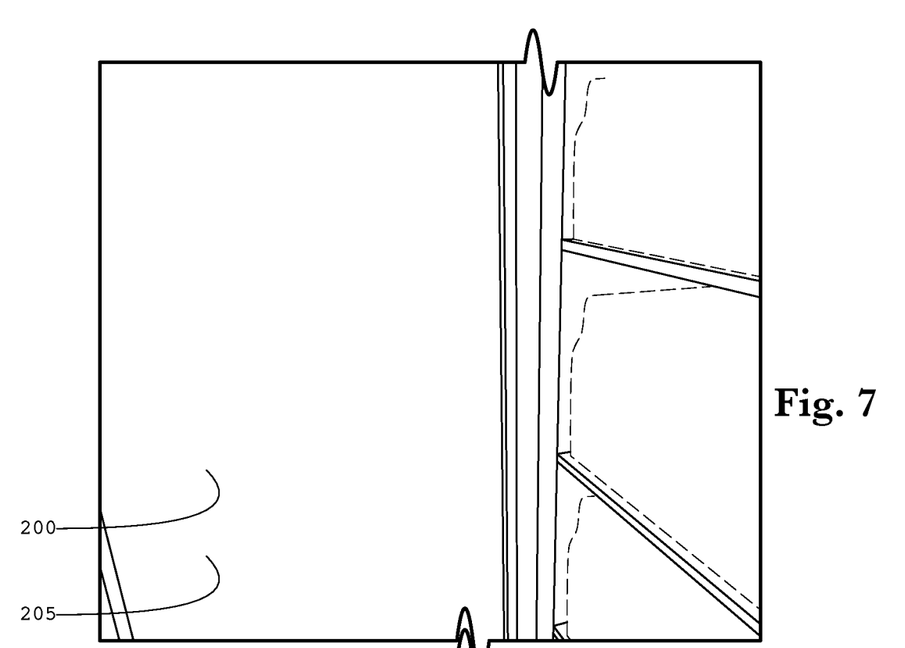
FIG. 7 is a perspective view of the display case looking at the vertical interior door jamb.
Figure 8:
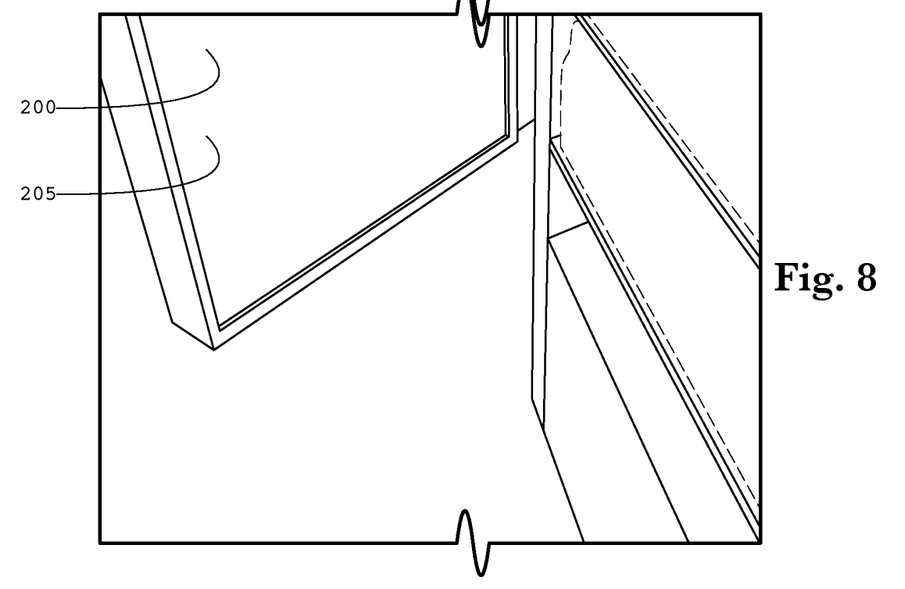
FIG. 8 is a perspective view of the display case looking at the horizontal bottom edge of the door and door frame.

FIG. 7 is a perspective view of the display case looking at the vertical interior door jamb. FIG. 8 is a perspective view of the display case looking at the horizontal bottom edge of the door and door frame. As can be observed in these Figures, no wiring is necessary to run the signals for the various data laid out above between the wireless devices 450/455. Not only does this provide an aesthetically pleasing look, but it also prevents wires from being tampered with or harmed through use of the display case or through the malicious intent of the general public.

The wireless devices 450/455 can operate under any form of wireless networking technology, including but not limited to: WPAN, WLAN, a wireless mesh network, or GAN. Specifically regarding the architecture for a WLAN network, these could include but are not limited to stations, basic service set, extended service set, and a distribution system. Further regarding the types of wireless LANs, these could include but are not limited to peer-to-peer, bridge, and a wireless distribution system. Any form of general encryption method can be used with the exemplary embodiments herein.

The embodiments of the wireless communication and transparent LCD system described herein can be used with any number of display case designs, either temperature controlled or not, and with doors that open or glass that remains stationary. Although shown here with a transparent LCD, the wireless system could be used with a traditional backlit LCD as well.

Figure 9:
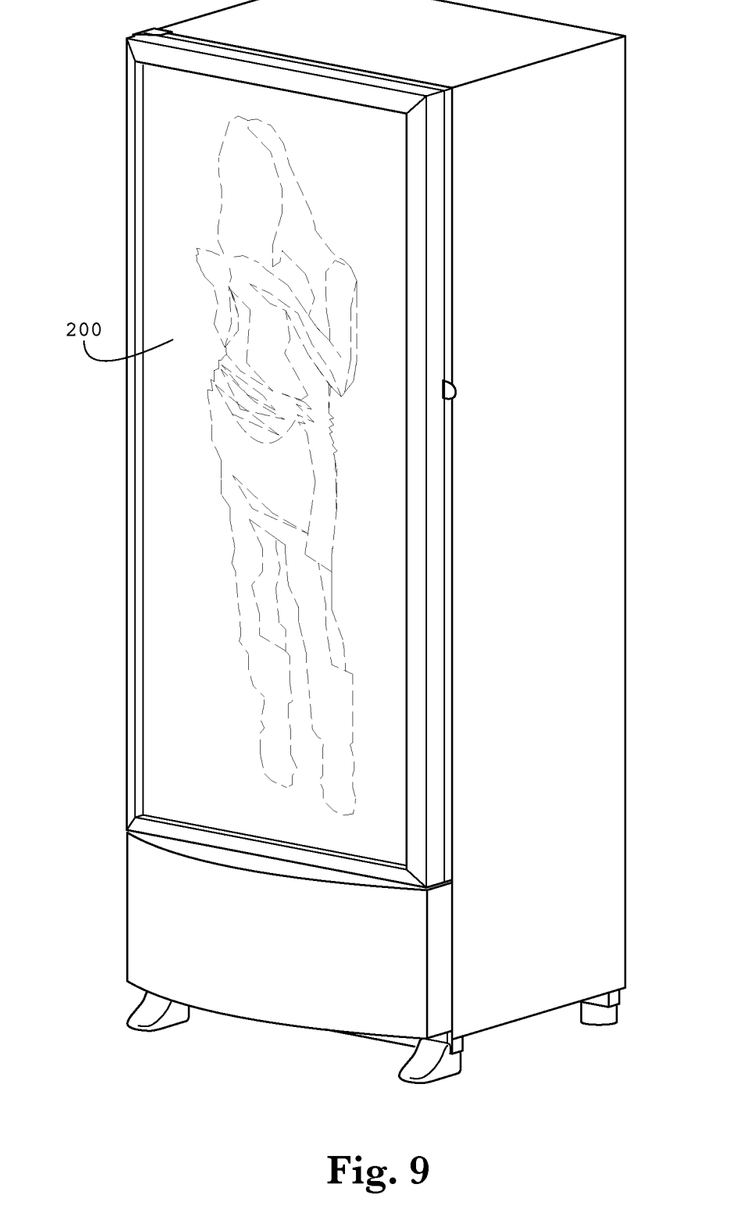
FIG. 9 is a perspective view of the display case where a video is being shown on the transparent LCD.

FIG. 9 is a perspective view of the display case where a video is being shown on the transparent LCD 200.

Figure 10:
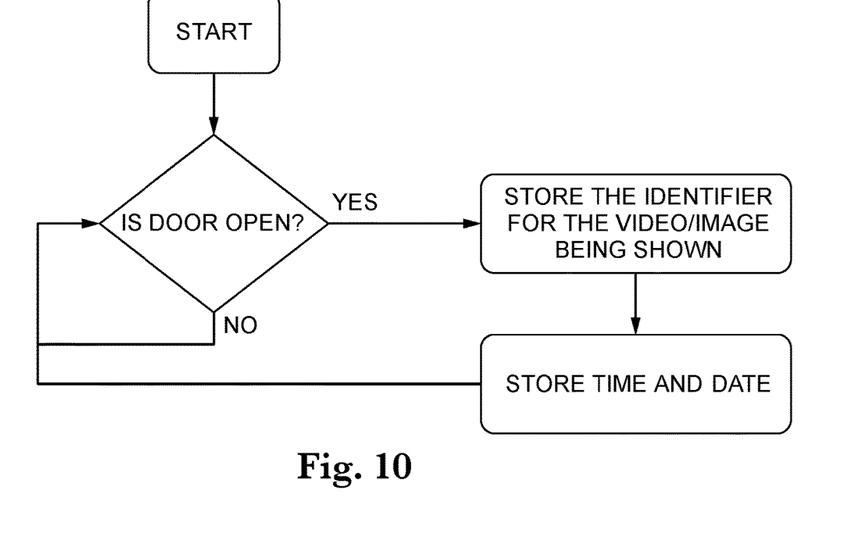
FIG. 10 is a logic flow chart for operating the hardware and software within the display case.

FIG. 10 is a logic flow chart for operating the hardware and software within the display case, specifically the CPU 455 and door sensor 600. By operating with this logic, the date/time as well as an identifier for the particular video/image being shown can be stored.

Figure 11:
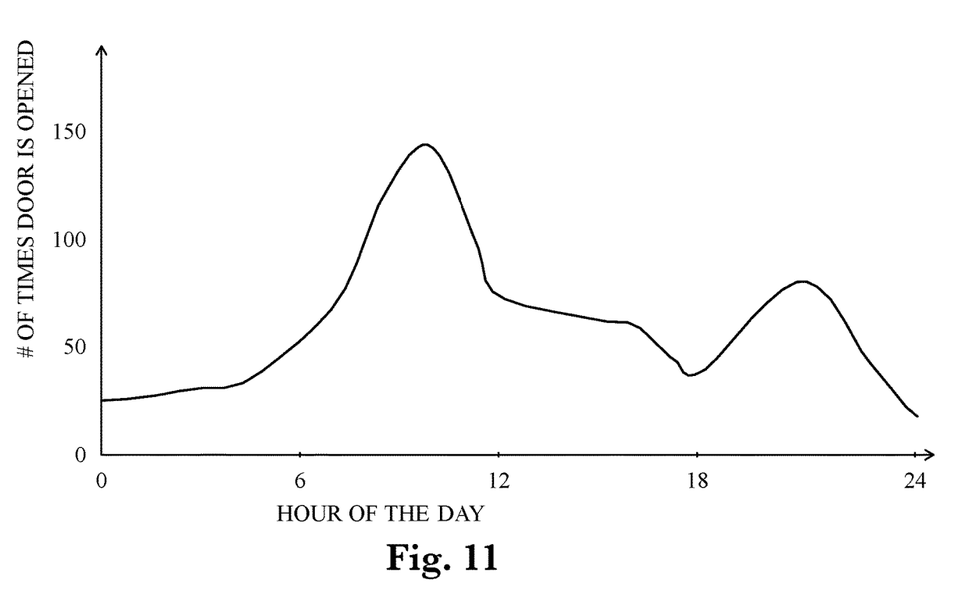
FIG. 11 is a graphical representation of the data collected by the hardware and software described above.

FIG. 11 is a graphical representation of the data collected by the hardware and software described above. Once the data is collected, low traffic and high traffic throughout the day can be analyzed. This traffic data can be useful in many ways. For example, it may be determined that it is preferred to hold the temperature of the display case at 32 degrees F. when the door is opened more than 100 times per hour, but only 35 degrees F. when the door is opened less than 50 times per hour. In this way, the usage rate and temperature of the display case can be correlated in order to save energy costs. For example, we know that we can now raise the temperature of the display case to 35 degrees F. from hours 0-6, 18, and 23-24 without risking damage to the contents. This requires less energy and can provide enormous cost savings when used for thousands of display cases.

Figure 12:
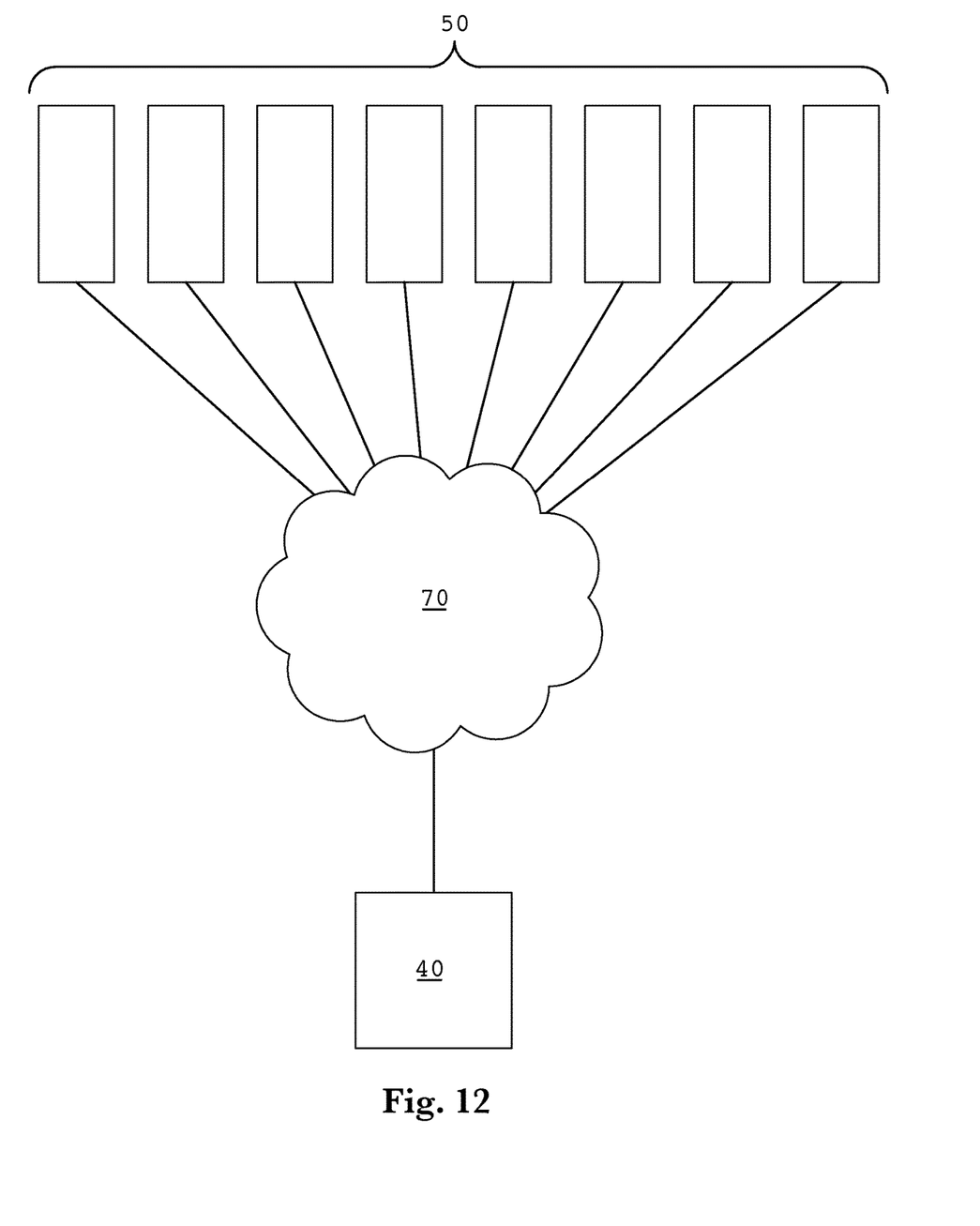
FIG. 12 is an electrical schematic representation of an exemplary embodiment of the system for tracking and analyzing display case usage.

FIG. 12 is an electrical schematic representation of an exemplary embodiment of the system for tracking and analyzing display case usage. Here, a plurality of display cases 50 are in communication with an internet/cellular network 70. Here, an operations center contains at least one CPU 40 which can communicate with the plurality of display cases 50 through the internet/cellular network 70. Generally speaking, if the internet/cellular network 70 is only internet, the CPU 455 and CPU 40 should each have some type of modem. Also generally speaking, if the internet/cellular network 70 is only cellular, the CPU 455 and CPU 40 should each have some type of cellular transmitter/receiver, and preferably a 4G cellular transmitter/receiver.

Figure 13:
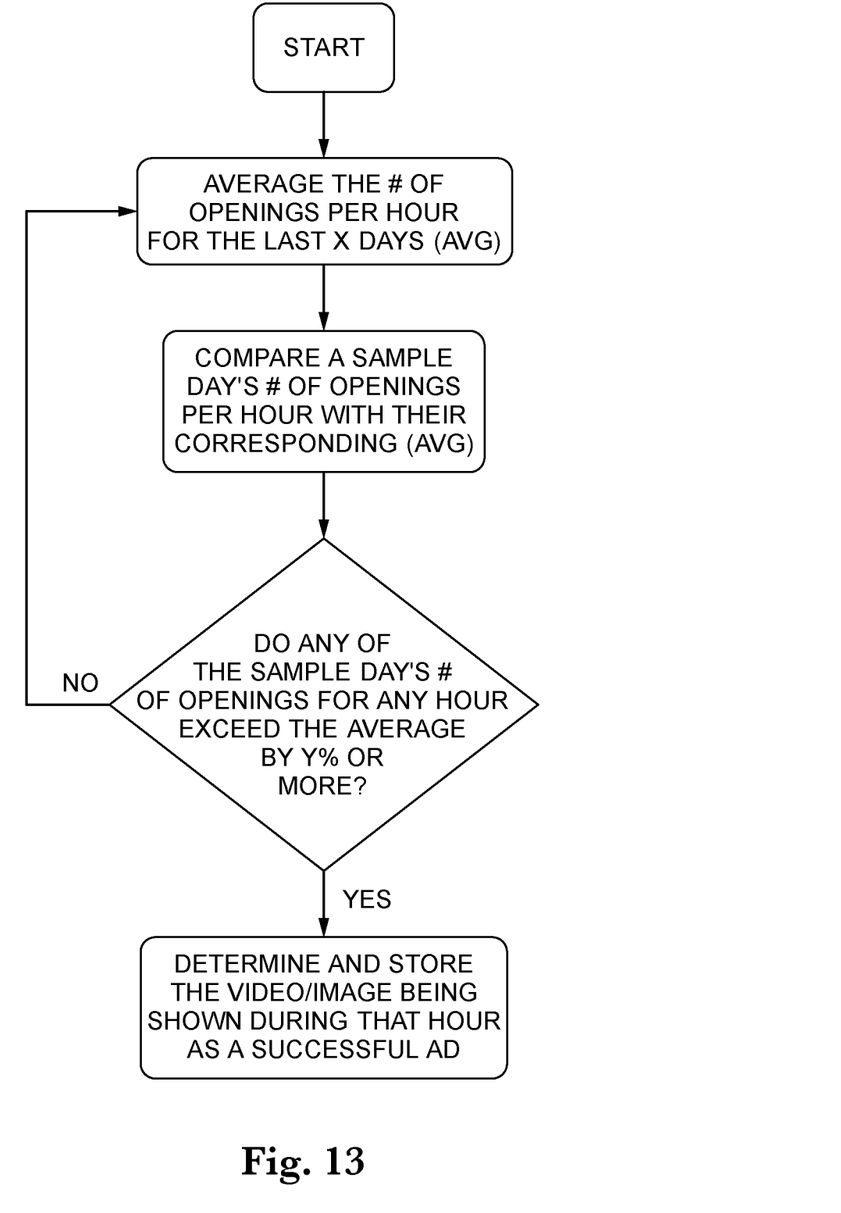
FIG. 13 is a logical flowchart that can be performed by the operations center and the computing devices utilized therein.

FIG. 13 is a logical flowchart that can be performed by the operations center and the computing devices utilized therein. Initially, the number of door openings per hour for each day can be averaged over the last X days (where X could be any number of days) to get an hourly average (AVG). Then, the number of openings per hour for any sample day can be compared with their corresponding AVG for that hour. Next, the logic can determine if the openings during any of the hours during the sample day exceed the hourly average by Y % or more (where Y can be set at any significant percentage depending on the data, but generally should be 15% or higher). If so, the identifier for the video/image being shown during that time is stored as a successful advertisement. In this way, advertisements that appear to create the most traffic within the cooler can be tracked or recorded so that these advertisements can be shown more often or so that future advertisements can be designed around the successful advertisements of the past. This provides the content providers with an unprecedented amount of control over their advertising, and specifically the effectiveness of their advertising.

It should be noted that, although the above embodiments deal mostly with the number of door openings per hour, this could be performed by the number of openings during any time interval, either in minutes, hours, full days, or any combination. The system could also be used to determine the number of openings during each video segment, average these values (optionally), standardize the averages based on how long the videos were to obtain a number of openings per second/minute, and/or determine which videos created the highest number of openings.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A method for tracking and analyzing consumption of consumer goods, said method comprising:
providing a transparent electronic display for displaying advertising content related to the consumer goods, a sensor configured to detect whether any of the consumer goods have been selected by a customer, and a CPU in electrical communication with the sensor and the transparent electronic display;
displaying a variety of advertising content on the transparent electronic display;
monitoring the sensor; and
storing consumption data regarding the content displayed on the transparent electronic display when the sensor detects that any of the consumer goods have been selected.

2. The method of claim 1, further comprising
providing a wireless transmitter/receiver in electrical communication with the CPU; and
transmitting the consumption data to a remote location.

3. The method of claim 1, further comprising
calculating a current average of the number of times any of the consumer goods have been selected over a specified period of time.

4. The method of claim 3, further comprising
comparing the current average to a historical average of the number of times any of the consumer goods have been selected over a second specified period of time.

5. The method of claim 4, further comprising
storing data regarding the identity of the advertising content displayed on the transparent electronic display when the current average exceeds the historical average.

6. The method of claim 5, wherein:
the transparent electronic display is positioned such that that the consumer goods and the advertising content are capable of being viewed simultaneously.

7. The method of claim 6, wherein:
the transparent electronic display is located within an access panel for a display case that showcases the consumer goods.

8. The method of claim 7, wherein:
the sensor detects whether any of the consumer goods have been selected by detecting whether the access panel has been opened.

9. The method of claim 7, wherein:
the sensor detects whether any of the consumer goods have been selected by detecting whether the access panel has been closed.

10. The method of claim 7, wherein:
the display case is a refrigerated cooler; and
the access panel is a door for the refrigerated cooler.

11. The method of claim 1, wherein:
the consumption data comprises the time and date the that the consumer goods are selected.

12. A system for tracking and analyzing consumption of consumer goods comprising:
a transparent electronic display configured to display advertising content related to the consumer goods, wherein the consumer goods are located in close proximity with the transparent electronic display;
a sensor configured to track whether any of the various consumer goods have been selected by a customer;
a CPU in electrical communication with the sensor and the transparent electronic display, wherein the CPU is configured to store consumption data regarding the content displayed on the transparent electronic display when the sensor detects that any of the consumer goods have been selected; and
a wireless transmitter/receiver in electrical connection with the CPU configured to transmit the consumption data to a remote location.

13. The system of claim 12, wherein:
the transparent electronic display is located within an access panel for a display case that showcases the variety of consumer goods such that the advertising content and the consumer goods are capable of being viewed simultaneously.

14. The system of claim 13, wherein:
the sensor detects whether any of the various consumer goods have been selected by detecting whether the access panel has been opened.

15. The system of claim 12, wherein:
the consumption data comprises the time and date the that the consumer goods were selected.

16. The system of claim 15, further comprising:
an electronic storage device in electrical communication with the CPU and comprising executable software instructions, which when executed, configure the CPU to calculate a current average of the number of times any of the consumer goods have been selected over a specified period of time.

17. The system of claim 16, further comprising:
additional executable software instructions, which when executed, configure the CPU to compare the current average to a historical average of the number of times any of the consumer goods have been selected over a second specified period of time and store data regarding the identity of the content displayed on the electronic display when the current average exceeds the historical average.

18. A method for tracking and analyzing consumption of consumer goods, said method comprising
providing a transparent electronic display for displaying advertising content related to the consumer goods, a sensor configured to detect whether any of the consumer goods have been selected by a customer, a CPU in electrical communication with the sensor and the transparent electronic display, and a wireless transmitter/receiver in electrical communication with the CPU; and
displaying a variety of advertising content on the transparent electronic display;
monitoring the sensor;
storing consumption data regarding the content displayed on the transparent electronic display when the sensor detects that any of the consumer goods have been selected;
transmitting the consumption data to a remote location;
calculating a current average of the number of times any of the consumer goods have been selected over a specified period of time;
comparing the current average to a historical average of the number of times any of the consumer goods have been selected over a second specified period of time; and
storing data regarding the identity of the content displayed on the electronic display when the current average exceeds the historical average.

19. The method of claim 18, wherein:
the transparent electronic display is positioned such that that consumer goods and the advertising content may be viewed simultaneously.

20. The method of claim 19, wherein:
the transparent electronic display is housed in an access panel of a refrigerated display case.

* * * * *

UNITED STATES PATENT AND TRADEMARK OFFICE
CERTIFICATE OF CORRECTION

PATENT NO. : 10,679,243 B2
APPLICATION NO. : 16/295591
DATED : June 9, 2020
INVENTOR(S) : William Dunn Page 1 of 1

It is certified that error appears in the above-identified patent and that said Letters Patent is hereby corrected as shown below:

In the Claims

Column 6, Line 8, please insert -- : -- after the word comprising.
Column 6, Line 13, please insert -- : -- after the word comprising.
Column 6, Line 17, please insert -- : -- after the word comprising.
Column 6, Line 21, please insert -- : -- after the word comprising.
Column 7, Line 28, please insert -- : -- after the word comprising.

Signed and Sealed this
Fourteenth Day of July, 2020

Andrei Iancu
*Director of the United States Patent and Trademark Office*